S. D. JONES.
LUBRICATOR.
APPLICATION FILED DEC. 24, 1910.
1,002,917.
Patented Sept. 12, 1911.
2 SHEETS—SHEET 1.
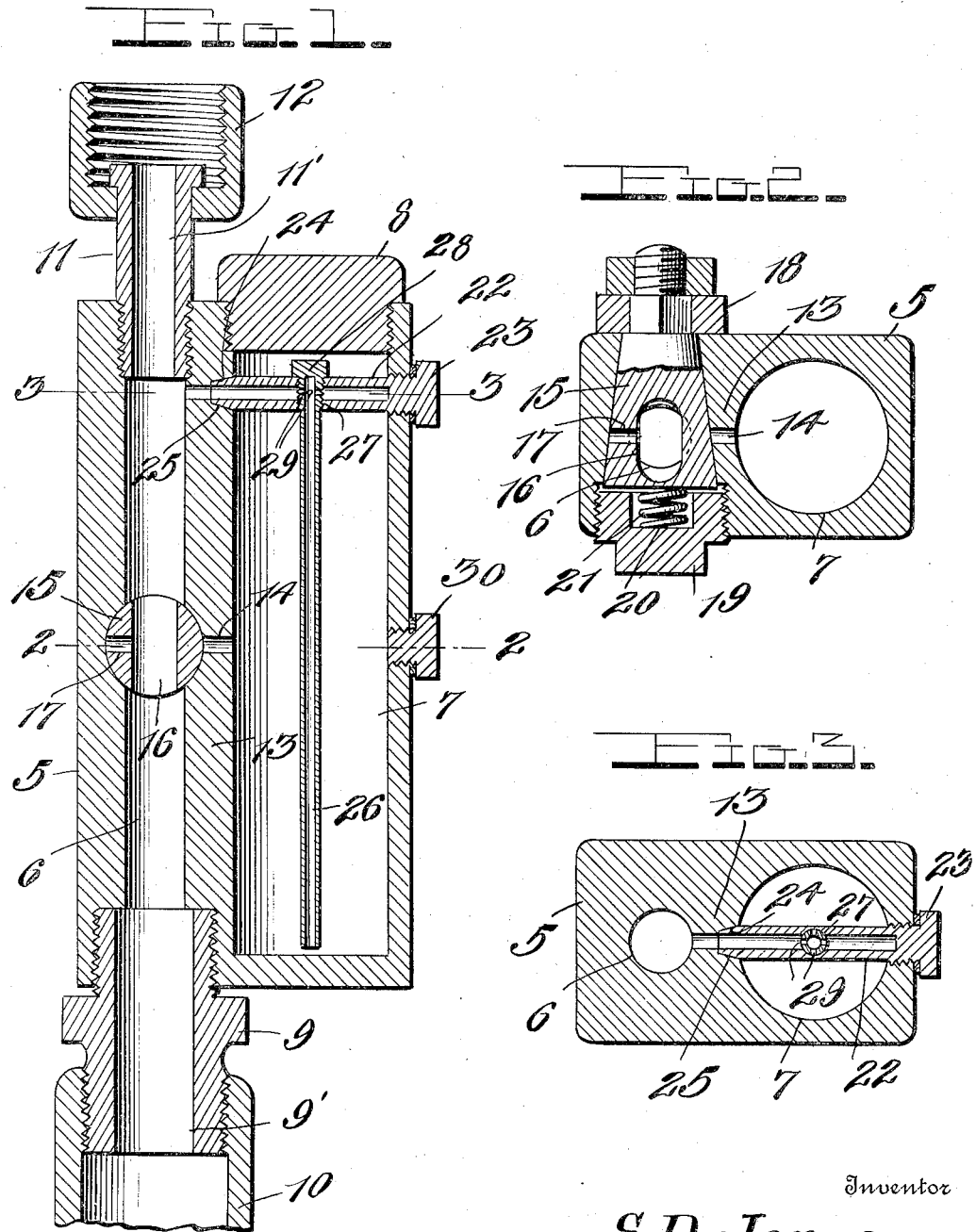
Witnesses
Chas. L. Griesbauer.
M. F. Reeder
Inventor
S. D. Jones,
By Watson E. Coleman.
Attorney

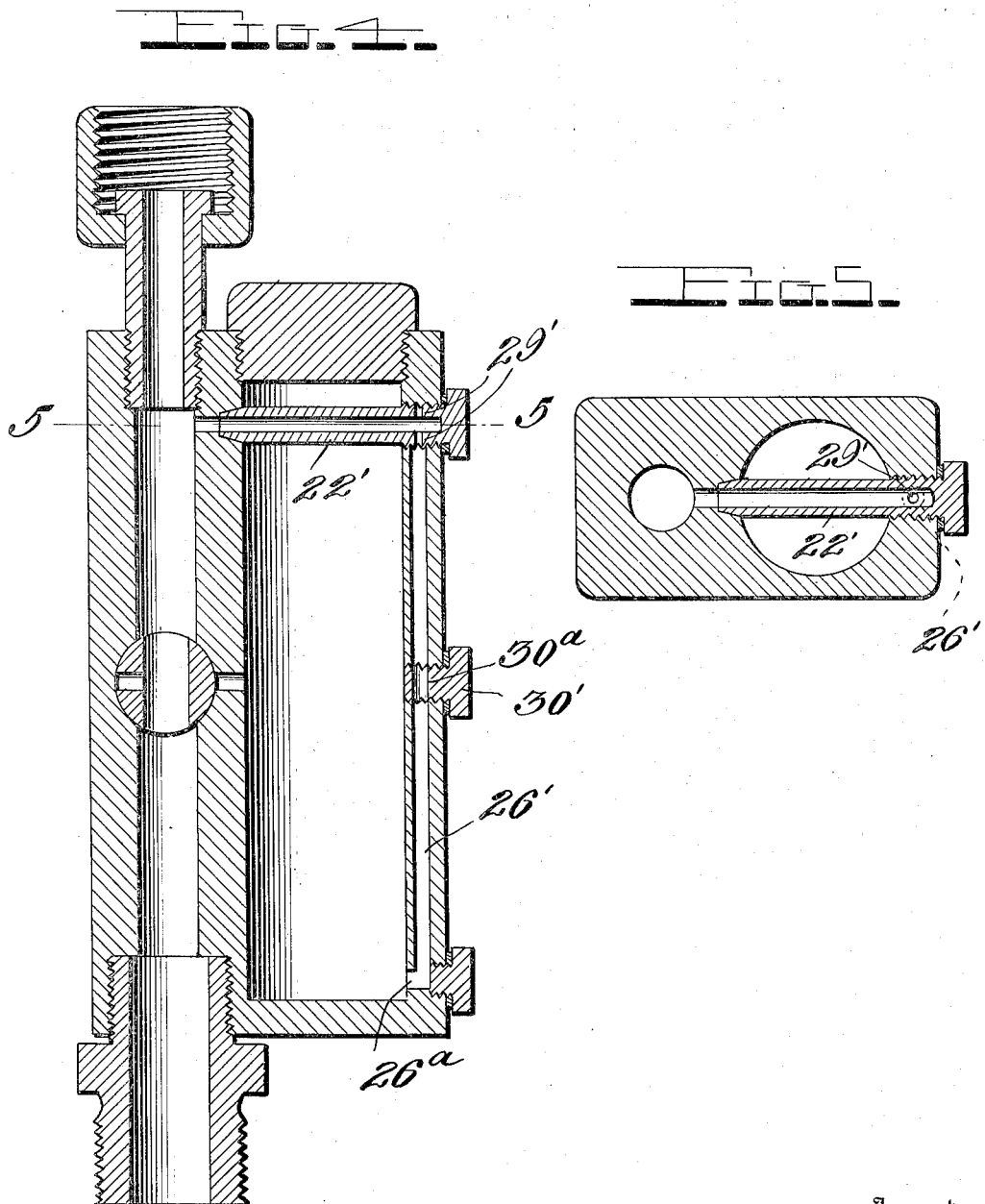

UNITED STATES PATENT OFFICE.

STARKY DANIEL JONES, OF GEORGETOWN, COLORADO.

LUBRICATOR.

1,002,917. Specification of Letters Patent. Patented Sept. 12, 1911.

Application filed December 24, 1910. Serial No. 599,213.

*To all whom it may concern:*

Be it known that I, STARKY DANIEL JONES, a citizen of the United States, residing at Georgetown, in the county of Clear Creek and State of Colorado, have invented certain new and useful Improvements in Lubricators, of which the following is a specification, reference being had to the accompanying drawings.

This invention relates to lubricators and more particularly to a lubricator which is especially designed for use upon drills and other machines of that character which employ compressed air as an actuating medium.

The invention has for its primary object the provision of a lubricator of simple and novel construction whereby the lubricant is supplied to the parts to be lubricated by the admission of air to the lubricant reservoir.

A further object of my invention is to provide a lubricator consisting of very few parts which may be easily and quickly assembled, and one which is reliable and efficient in practical use and may be manufactured at small cost.

With the above and other objects in view, the invention consists of the novel features of construction, combination and arrangement of parts hereinafter fully described and claimed, and illustrated in the accompanying drawings, in which—

Figure 1 is a longitudinal section of a lubricator embodying my improvements; Fig. 2 is a section taken on the line 2—2 of Fig. 1; Fig. 3 is a section taken on the line 3—3 of Fig. 1; Fig. 4 is a longitudinal section illustrating a slightly modified form of the invention; and Fig. 5 is a detail section taken on the line 5—5 of Fig. 4.

Referring in detail to the drawing 5 designates the body of the lubricator which is longitudinally bored at one side of its center to provide an air passage 6 therethrough. A longitudinal cylindrical chamber or oil reservoir 7 is also formed in the body of the lubricator, one end of said chamber being permanently closed, and the other end thereof threaded to receive a closure plug 8 whereby the reservoir may be supplied with the lubricating fluid. In one end of the casing or body 5 a hose connecting plug 9 is threaded, said plug having a longitudinal bore 9′ which is alined with the air passage 6. An air supply hose 10 is threaded upon the other end of the plug 9 and extends to the source of air supply. In the other end of the casing, a stem 11 is threaded which is also longitudinally bored as at 11′ and communicates with the upper end 6′ of the air passage 6. A coupling member 12 is arranged upon the stem 11 and provides means whereby the lubricator is connected to the drill or other machine at the air intake port.

The wall 13 between the air passage 6 and the lubricant reservoir 7 is provided with the transverse communicating ports 14, one of said ports being disposed in the upper end of said wall and the other intermediate of the ends of the lubricant chamber. A two-way valve 15 is seated in the walls of the air passage 6 and is provided with a main port 16 and a smaller port 17 which communicates with the main port and opens upon one side of the valve. In the normal position of this two-way valve, when air is being supplied to the machine, the port 16 is longitudinally disposed with relation to the passage 6, as shown in Fig. 1 and communication between the lubricant reservoir 7 and said passage is closed by the valve member. A suitable handle 18 is arranged upon the reduced end of the valve 15 which extends exteriorly of the body 5. The valve is retained in its seat by means of the threaded plug 19 which is disposed in the body of the lubricator and is formed with a recess 20 to receive a coiled spring 21. This coiled spring bears upon the end of the valve member 15 and forces the valve into frictional engagement with its seat to prevent the escape of air between the same and the wall 13. As the valve or its seat becomes worn, the spring 21 acting upon the valve member takes up this wear and at all times holds the valve in close engagement with the walls of its seat. The valve member may be easily inserted or removed by simply removing the plug 19 and the operating handle 18.

In the upper end of the wall of the reservoir 7 a tubular oil conducting member 22 is threaded. One end of this member is provided with a head 23, and the other end thereof is tapered as shown at 24 for engagement in the tapered seat 25 formed in the wall 13 at one end of the port 14 which connects the reservoir 7 to the passage 6 at the upper end of said wall. A vertically disposed tube 26 extends substantially the entire length of the reservoir chamber 7 and is disposed through a transverse screw threaded opening 27 which extends through the oil conducting member 22 and intersects the longitudinal bore thereof intermediate of its ends. The upper end of the tube 26 is provided with a knurled head 28 whereby it may be conveniently inserted and secured in its proper position. The lower open end of the tube 26 is disposed slightly above the bottom of the reservoir 7 so that the lubricating fluid may freely enter the same in the operation of the device. Adjacent to the other end of the tube in the threaded portion thereof the same is provided with a plurality of perforations 29 which afford communication between said tube and the longitudinal bore of the tubular member 22.

In the operation of the device, the valve member 15 is rotated in its seat from the position shown in Fig. 1 which it occupies in the operation of the drill or other machine, so as to dispose the port 17 in alinement with the port 14, thereby reducing temporarily the supply of air to the machine. The admittance of the compressed air to the reservoir 7 acts upon the oil contained therein to force the same upwardly through the tube 26, from whence the lubricant is discharged from the perforations 29 in the upper end of said tube into the bore of the tubular conducting member 22. From this member the oil flows through the upper bore 14 into the air passage 6. The valve is now immediately returned to its normal position so as to permit of the free flow of air from the source of supply through the passage 6 and connection 11 to the machine. The velocity of the air carries the oil in suspension through the connections between the lubricator and the machine to the parts to be lubricated. Thus it will be seen that the lubricant is not discharged all in one place but is sprayed so as to more effectively lubricate the machine elements. The reservoir 7 has a plug 30 threaded in its wall intermediate of its ends to provide a closure for the opening therein through which the drill extends in the boring of the port 14. The member 22 closes the opening in the upper end of the reservoir wall which is provided for a similar purpose.

In Fig. 4 I have illustrated a slightly modified form of the invention wherein the tube 26 is dispensed with and in lieu thereof I form a vertical longitudinal passage 26' in the wall of the reservoir 7. The lower end of this passage is open and communicates with the reservoir as shown at 26ª. The plug 30' which is threaded in the reservoir wall is provided with a transverse opening 30ª which is disposed in alinement with the passage 26' so as to provide an uninterrupted flow of the oil from the lower end of the passage to the upper end thereof wherein, the conducting member 22' is disposed. This member is similar in form and construction to that used in the preferred form of the device with the exception that the openings 29' are arranged therein adjacent to its outer end instead of its center. It is believed that the operation of this form of the lubricator will be obvious, the principle remaining precisely the same as in the preferred construction.

From the foregoing it will be seen that I have devised a very simple and novel form of lubricator for use upon machines which employ air as the actuating fluid. The device is very simple and reliable in operation, and by simply adjusting the two-way valve, a small quantity of oil may be supplied to the machine elements at intervals in the operation of the machine, thus keeping the parts thoroughly lubricated. Owing to its simplicity it may also be constructed at an extremely low cost.

While I have shown and described the preferred construction and arrangement of the various parts, it will be understood that the device is susceptible of considerable modification without departing from the essential feature or sacrificing any of the advantages thereof.

Having thus described the invention what is claimed is:—

1. A lubricator of the character described comprising a body having an air passage formed therein and an oil reservoir arranged in parallel relation to said air passage, the wall separating said passage and reservoir having ports therein connecting the same, a two-way valve arranged centrally in the air passage and normally closing communication between the same and said reservoir, said valve having a port therein adapted to aline with one of the ports between the air passage and reservoir to connect the same, and a tubular conducting member arranged transversely in the upper end of said reservoir and having its ends engaged in the walls thereof, the open end of said conducting member being disposed in alinement with the other of the ports, said member being adapted to receive and discharge the oil into the air passage when air is admitted to the reservoir.

2. A lubricator of the character described comprising a body having a longitudinal air passage therein and an oil reservoir, said reservoir and air passage being connected, a valve normally closing communication between the air passage and reservoir and adapted to be manually actuated to open communication between the same at times to admit air into the reservoir, a conducting member disposed in the upper end of the reservoir and having a longitudinal bore communicating with the air passage, and means arranged in the reservoir connected to said member to supply oil thereto under pressure of the air which is admitted to the reservoir.

3. A lubricator comprising a body having an oil reservoir therein, said body also having an air inlet and outlet port and communicating ports connecting the reservoir with said air ports, means normally closing communication between the reservoir and said air ports adapted to be manually actuated to admit air to the reservoir at certain times, a tubular oil conducting member arranged in the wall of said reservoir at its upper end and communicating with the air port, a tube longitudinally disposed in the reservoir and open at one end, said tube being connected to the conducting member to supply oil to the bore thereof from whence it is discharged into the air passage under pressure of the air which is admitted to the reservoir.

4. A lubricator of the character described comprising a body having an air passage therein and an oil reservoir, the wall separating said passage and reservoir having a port therein intermediate of its ends, a two-way valve seated in the passage to normally close communication between the same and the reservoir and adapted to be manually actuated to open communication therebetween at certain times, said intermediate body wall having a second port therein adjacent to one end, a tubular oil conducting member disposed through the reservoir wall and seated in one end of said latter port, a tube disposed centrally in the oil reservoir and open at one end, said conducting member having a transverse threaded opening therein to receive the upper end of said tube, said upper end of the tube having a plurality of perforations opening into the bore of the conducting member to supply oil thereto under the pressure of air which is admitted to the reservoir.

In testimony whereof I hereunto affix my signature in the presence of two witnesses.

STARKY DANIEL JONES.

Witnesses:
  C. B. IRELAND,
  F. T. GERISCHER.